United States Patent
Dilo

(10) Patent No.: US 7,581,294 B2
(45) Date of Patent: Sep. 1, 2009

(54) METHOD OF MANUFACTURING A NONWOVEN

(75) Inventor: Johann P. Dilo, Eberbach (DE)

(73) Assignee: Oskar Dilo Maschinenfabrik KG, Eberbach (DE)

(*) Notice: Subject to any disclaimer, the term of this patent is extended or adjusted under 35 U.S.C. 154(b) by 0 days.

(21) Appl. No.: 12/164,955

(22) Filed: Jun. 30, 2008

(65) Prior Publication Data

US 2009/0017711 A1     Jan. 15, 2009

(30) Foreign Application Priority Data

Jul. 9, 2007    (EP) ................... 07013400

(51) Int. Cl.
*D04H 5/08* (2006.01)
(52) U.S. Cl. .................. 28/101; 28/104; 28/107; 19/163; 19/300
(58) Field of Classification Search .............. 28/101, 28/102, 104, 107, 103, 105, 112–114, 117, 28/165, 167; 19/163, 161.1, 296, 300, 302, 19/65 A, 98, 99; 700/130, 142, 143; 156/148, 156/64, 62.4, 62.6, 324
See application file for complete search history.

(56) References Cited

U.S. PATENT DOCUMENTS

| | | | |
|---|---|---|---|
| 4,107,822 A * | 8/1978 | Brown ................. | 19/163 |
| 4,944,502 A * | 7/1990 | Platzer et al. .......... | 270/30.12 |
| 5,060,347 A * | 10/1991 | Beckers ............... | 28/101 |
| 5,233,727 A * | 8/1993 | Baechler .............. | 19/300 |
| 5,301,399 A * | 4/1994 | Erhardt ............... | 28/102 |
| 5,325,571 A * | 7/1994 | Bolliand .............. | 28/112 |
| 6,189,185 B1 * | 2/2001 | Bioul et al. ........... | 19/163 |
| 6,195,844 B1 * | 3/2001 | Jourde et al. .......... | 19/163 |
| 6,434,795 B1 * | 8/2002 | Jourde et al. .......... | 19/161.1 |
| 6,662,407 B2 * | 12/2003 | Bernhardt et al. ...... | 19/161.1 |
| 2003/0050717 A1 * | 3/2003 | Hirata et al. .......... | 700/90 |

FOREIGN PATENT DOCUMENTS

| | | |
|---|---|---|
| DE | 197 43 279 | 4/1991 |
| DE | 4304988 | * 4/1994 |
| EP | 1057906 | * 12/2000 |
| EP | 1 319 492 | 6/2003 |
| EP | 1 715 093 | 10/2006 |
| GB | 2 080 716 | 2/1982 |
| JP | 58 187210 | 11/1983 |

* cited by examiner

*Primary Examiner*—Amy B Vanatta
(74) *Attorney, Agent, or Firm*—Jansson Shupe & Munger Ltd.

(57) ABSTRACT

In the production of a solidified nonwoven web by crosslaying a card web produced with a uniform transverse profile by a card web forming device and then by consolidating the crosslaid nonwoven web thus formed, the basis weight of the solidified nonwoven web or of the crosslaid nonwoven web is measured only in the middle and in the area of at least one of its edges, and the basis weight of the card web to be laid is locally changed on the basis of a comparison of the measurement values with the nominal values preestablished by the laws, previously described for the nonwoven web to be produced, governing the structural change in the product caused by solidifying.

10 Claims, 1 Drawing Sheet

METHOD OF MANUFACTURING A NONWOVEN

CROSS REFERENCE TO RELATED APPLICATION

This application claims priority based on European patent application EP 07 013 400.2, filed Jul. 9, 2007.

FIELD OF THE INVENTION

The invention pertains to a method for producing a solidified nonwoven web such as a needled felt by crosslaying a card web with a uniform transverse profile produced by a card web forming device and then by solidifying the crosslaid nonwoven web, wherein the basis weight of the solidified product or of the crosslaid nonwoven web is measured continuously and used to influence the laying of the card web.

DESCRIPTION OF THE PRIOR ART

It is known that, during the needling of a nonwoven web, both the length and the width of the web decrease as a result of distortion effects, and it also acquires a different thickness structure or basis weight profile in that the thickness of the needled material web becomes greater in the area near the edges than in the middle. The same effect can be observed when a nonwoven web is solidified by means of other methods such as hot-air solidifying, heat-setting, or entangling methods such as those based on the use of jets of water, steam, or air. Because the jet nozzles are arranged in a manner similar to that used for the needles of a needle machine, the entangling methods have similar effects on the solidified material web during its production. Heat-setting leads to uneven shrinkage of the web in the direction transverse to the web direction, which can be seen as a change in its profile.

An irregular thickness and/or basis weight profile is usually undesirable, because the thicker edge areas must be cut off in certain cases, which leads to a loss of material. A remedy has been proposed in EP 0 315 930 32, for example, according to which a method working in cooperation with a crosslayer is used. Here the nonwoven web to be needled is subjected to a precompensation step, in which the web is given a transverse profile which is thinner at the edges than in the middle. According to the cited method, this can be achieved by controlling the movements of the upper carriage and the laying carriage of the crosslayer independently of each other in such a way that the sections of the card web to be laid which will be located in the edge areas of the nonwoven web are stretched within the crosslayer to make them thinner than the other sections. Because this stretching step can be influenced by appropriate control interventions in the various machines which participate in the processing of the card web, it is logical to monitor the work result by making suitable measurements and on that basis to exert an influence on the stretching method.

EP 1 057 906 B1 describes in this regard a nonwoven production system, in which a measuring device for determining the basis weight of the nonwoven web is installed at a suitable location downstream of the outlet of the crosslayer. The acquired basis weight values are used to adjust the profile formation unit, so that the desired profile can be effectively adjusted and monitored or controlled. To automate this monitoring and control, the measuring unit is connected to the profile formation unit to form an automatic control circuit. The measuring unit can also be installed downstream of a needle machine, as a result of which it can detect any possible density defects in the end product. The measuring unit extends transversely across the entire laying width or nonwoven width and measures the basis weight of the nonwoven or needled felt at several points along the width of the web. To optimize the measurement results, a large number of measurement sites are provided, which are arranged in a row or at an offset from each other and which are positioned with the highest possible density.

A similar setup is known from U.S. Pat. No. 6,434,795 B1. This document describes a method for controlling the transverse profile of a nonwoven web in a nonwoven production system, in which a physical variable of the nonwoven web is measured in a measuring station at several points distributed across the width of the web so that the transverse profile of the nonwoven web can be recorded. If there is a discrepancy between the recorded profile and a reference profile, an operating parameter is corrected in such a way that the machine acts at a point in the transverse dimension of the card web to be laid which corresponds to the point of the laid nonwoven web where the discrepancy appeared and thus corrects it. What occurs, therefore, is an actual comparison at separately measured points, which are distributed transversely to the travel direction of the nonwoven web.

The known methods explained above require many measurements and many data-processing steps involving comparisons with predefined nominal values. This requires not only a large amount of apparatus but also a correspondingly large amount of data processing. A measuring system for a working width of 3.5 m, for example, currently costs approximately €80,000.

SUMMARY OF THE INVENTION

It is an object of the present invention to provide a method of the type indicated above which operates with only a limited amount of apparatus.

The invention is based on the idea that the widthwise contraction of a nonwoven web caused by the solidifying method such as needling and the associated increase in thickness at the edges of the solidified product such as a needled felt or nonwoven obey certain laws. This means that, when a nonwoven web with a cross section of uniform thickness is solidified, the transverse profile of the solidified product will be changed in a quite specific way, that is, in a reproducible way, which is determined by the parameters used during the production of the solidified product.

These parameters can be divided into a first set, namely, the parameters which determine the nonwoven web to be solidified, and a second set, namely, the parameters which determine the solidifying method. The first parameters include, for example, the type of fiber in the broadest sense, the fiber orientation caused by the type of carding, the thickness of the card web, the number of card web layers laid on each other, and the angle to the nonwoven web to be needled at which the layers are laid, this angle also influencing the orientation of the fibers in the nonwoven web. The type of fiber is determined by, for example, the fiber material, the fiber thickness, the fiber length, and the fiber texture. The parameters determining the solidifying method are, in the case of needling, for example, the needle board assembly in the broadest sense, including its thickness, the fineness of the needles, the penetration depth of the needles into the nonwoven web, the residence time of the needles in the nonwoven web, and the advance of the nonwoven web per stitching cycle. This applies comparably to other solidifying techniques such as the jet technique, except that, in that case, in contrast to the needling technique, work is not carried out in cycles and measures involving the feed rate per cycle are therefore not needed. In the case of thermal and chemical solidifying methods, the corresponding parameters are to be taken into account as appropriate. The inventive method can also be used for Mali-fleece solidifying. Combinations of the previously mentioned types of solidifying can also be considered. The invention can also be used in conjunction with such combinations.

The first and second sets of parameters thus together determine a set of laws, which result not only in a quite specific widthwise contraction of the nonwoven web during solidifying, but also in a quite specific thickening of the edges of the solidified product and accordingly also in the need for a quite specific individual precompensation of the edge thickening by the use of measures which influence the transverse profile of the nonwoven web to be solidified.

For the quality control of the solidified product, e.g., a needled felt web, it is therefore sufficient in the extreme case to measure the needled felt web only at one edge and in the middle. Measurements are preferably made at both edges to exclude defects which could result from, for example, the asymmetric operation of the crosslayer. When the invention is applied, it is therefore not necessary to measure the entire profile transversely to the solidified material web at a large number of points and to compare them with nominal values. This decreases considerably the expenditure required in terms of apparatus and computer processing.

For all standard applications, the transverse profile, that is, the course of the profile, of a solidified nonwoven web produced with uniform thickness from a crosslaid nonwoven web is generally known. In these cases, the measurement in the inventive manner serves primarily the purpose of monitoring and quality assurance, there being no need to record the transverse profile and to set up on that basis a complicated stretching program for the card web draw frame. Comparison of the basis weight values measured at the edge of the solidified nonwoven web with the basis weight values measured in the middle of the web is sufficient to carry out the required compensation for standard situations.

In certain applications, the degree to which the edges have increased in thickness can vary widely, depending on the previously mentioned parameters. If the thickened edge areas extend over only a small part of the width of the needled nonwoven web, the thin areas to be produced in the card web by the draw frame only need to be short. If the edges have become only slightly thicker, the card web should be stretched only slightly in the areas which are to be made thinner. The converse is also true if the thickened edge areas cover a large part of the width or if the degree to which the edge areas have increased in thickness is pronounced. In these cases, it is necessary to figure out in advance the relationship between the parameters and the thickening of the edges, that is, the laws which govern the thickening, and, for example, to store them in memory. With the help of the parameters and the previously identified laws, it is then possible, on the basis of a comparison of the measurement values detected in the middle and at the edge of the nonwoven web with the stored values, to control the card web draw frame in such a way that the lengths of the thin areas required for the necessary compensation and the required degree of stretching in the card web are achieved, so that the profile changes which occur during the solidifying of the nonwoven web can be compensated in advance.

BRIEF DESCRIPTION OF THE DRAWINGS

The invention is described in greater detail below with reference to an exemplary embodiment, illustrated schematically in FIG. 1.

DETAILED DESCRIPTION OF THE INVENTION

Figure 1:
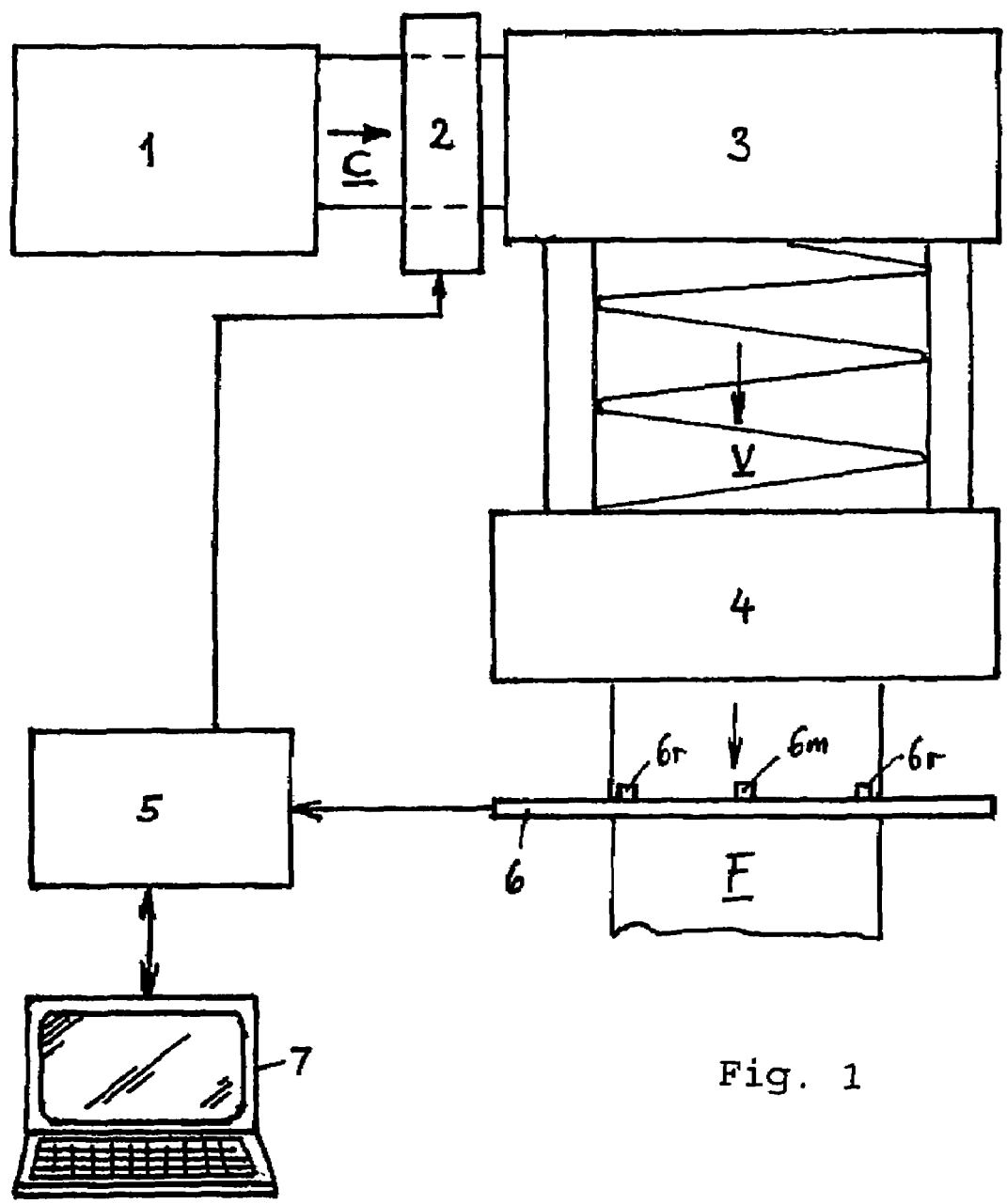

FIG. 1 shows by way of example a needled felt production system, consisting of a carding machine 1, a card web draw frame 2, a crosslayer 3, a needle machine 4, and a control unit 5, which is connected to a measuring station 6. A terminal 7 is also connected to control unit 5. Card web draw frame 2 is also connected to control unit 5.

In the example shown here, measuring station 6 is located downstream from needle machine 4 and has three sensors $6r$, $6m$, and $6r$. Sensor $6m$ is located in the middle, and sensors $6r$ are located near the two edges of the needled felt web F leaving needle machine 4.

By the use of a keyboard at terminal 7, the parameters which determine the production method of the needled felt web F, namely, the previously mentioned first set of parameters, which pertain to the nonwoven web V to be needled, namely, those which are implemented by carding machine 1 and crosslayer 3, and the second set of parameters, which pertain to the processing conditions to which the nonwoven web V leaving crosslayer 3 is subjected in needle machine 4, can be entered into control unit 5. Control unit 5 then searches its internal memory for the proper previously composed correction program for the operation of card web draw frame 2. This operating program contains data on the scope and intensity of the stretching method, that is, data on the increase and decrease in the degree of stretching over the length of the stretched section to which the card web C leaving carding machine 1 must be subjected in card web draw frame 2, and data on the chronological coordination between the operation of card web draw frame 2 and the operation of crosslayer 3, so that the thin areas produced in the card web C by card web draw frame 2 come to rest at predetermined points of the layered nonwoven web V produced by the crosslayer, namely, at points in its edge areas.

During operation of the system, if the settings of the operating program for card web draw frame 2 are correct, the card web C of uniform thickness leaving carding machine 1 will be processed by card web draw frame 2 into a web which has thin areas at regular intervals. This card web is laid in zigzag fashion by crosslayer 3 onto an output conveyor belt, wherein, as a result of the regularly occurring thin areas in the card web, a predetermined transverse profiling is produced in the crosslaid nonwoven web V which has a lower basis weight and thickness in the edge areas of the nonwoven web V than in the middle. If the system is operating correctly, furthermore, a needled product, that is, a needled felt web F with a uniform transverse thickness profile will be obtained at the outlet of needle machine 4 which processes the crosslaid nonwoven web V. The basis weight of the needled felt web F is monitored by sensors $6m$ and $6r$ in the middle and in the edge areas of the needled felt web F, and these values are transmitted to control unit 5. From there, the measurement results can be displayed on a monitor of terminal 7. It is also provided that control unit 5 intervenes correctively in the operation of draw frame 2 when the needled felt web F does not have same the basis weight in its edge areas as that which it has in the middle.

It is obvious that, when the system described here is to be used to produce a collection of products with different properties, a corresponding collection of different parameter data sets must be stored in the control unit, to each of which an individual control and correction program for card web draw frame 2 is assigned.

In the preceding description, reference has been made preferentially to the production of a needled felt, because the thickening of the edges represents a particular problem here, such as in the case of needled felt carpeting, where it is possible that, when a web of full width is butted up against a web of half width cut from the same roll, a step can be present between the two laid webs. The "product" in question, however, can be any solidified product in which a uniform thickness over the entire width of the web is required. Such products include filter cloths, in which uneven thicknesses or basis weights would lead to a nonuniform flow distribution. When, therefore, a needled felt is discussed in the description, this should not be understood as a limitation but rather as a representative of all types of solidified nonwoven materials.

In the preceding description, furthermore, the invention has been explained on the basis of an exemplary embodiment in which the measurement values are obtained from the needled nonwoven web, namely, a needled felt. It is therefore to be emphasized here that the measurements of the web can also be made before the solidifying of the crosslaid nonwoven web, because it is assumed according to the invention that there is a known relationship between the previously mentioned parameters and the thickening of the edges caused by the solidifying method. It is also known on the basis of this relationship what thickness or what basis weight the edges of the crosslaid nonwoven web must have in order that there will not be any thickening of the edges in the solidified nonwoven web. Measurement before solidifying is indicated, for example, in cases where a draw frame, which is intended to achieve a reorientation of the fibers, is installed between the crosslayer and the solidifying unit. Longitudinal stretching of the nonwoven web also leads to a change in its profile, which can be taken into account during the precompensation of the additional profile changes caused by the solidifying method. Measurement upstream of the solidifying unit results in a comparatively short controlled draw frame, which helps to minimize the production of waste.

When the measurements are made of the solidified nonwoven web, therefore, attention must be paid only to the equality between the measurements obtained in the middle and those obtained at the edges. When the measurements are made of the as-yet unsolidified nonwoven web, however, it is necessary to assume an inequality of the measurements, which is determined by the given relationship between the parameters and the thickening of the edges.

The invention claimed is:

1. A method for producing a solidified nonwoven web by crosslaying a card web produced with a uniform transverse profile by a card web forming device and then by solidifying the crosslaid nonwoven web thus formed, wherein the basis weight of the solidified nonwoven web is measured continuously and the measurement values are used to influence the laying of the card web, the method comprising the steps of:
   determining laws which govern the changes, caused by the solidifying method, in the basis weight distribution of the crosslaid nonwoven web under consideration of a plurality of production parameters;
   storing the laws in a control unit;
   measuring the basis weight of the solidified nonwoven web only in the middle and in the area of at least one of its edges by means of sensors located at these points;
   comparing the measurement values with the nominal values of the basis weight of the solidified nonwoven web preestablished by the laws; and
   changing one or more production parameters on the basis of the comparison under consideration of the stored laws.

2. The method according to claim 1 wherein the type of fibers forming the card web and the type of treatment to which the card web or nonwoven web is subjected during carding, crosslaying, and solidifying are taken into account when determining the laws.

3. The method according to claim 1 wherein the basis weight of the solidified nonwoven web is measured in the area of both edges.

4. The method according to claim 1 wherein the thickness of the card web to be laid is changed before its entry into a cross-layer.

5. The method according to claim 1 wherein the thickness of the card web is changed immediately before it is laid.

6. The method according to claim 1 wherein the crosslaid nonwoven web is solidified by needling.

7. The method according to claim 1 wherein the crosslaid nonwoven web is solidified by a fluid jet method.

8. The method according to claim 1 wherein the crosslaid nonwoven web is solidified according to the Mali-fleece method.

9. The method according to claim 1 wherein the crosslaid nonwoven web is solidified chemically.

10. The method according to claim 1 wherein the crosslaid nonwoven web is solidified thermally.

* * * * *